United States Patent [19]

Umekita et al.

[11] Patent Number: 5,655,082
[45] Date of Patent: Aug. 5, 1997

[54] COMMUNICATION CONTROL APPARATUS BETWEEN PROCESSOR SYSTEMS

[75] Inventors: Kazuhiro Umekita; Masatsugu Kametani, both of Tsuchiura, Japan

[73] Assignee: Hitachi, Ltd., Tokyo, Japan

[21] Appl. No.: 733,718

[22] Filed: Oct. 16, 1996

Related U.S. Application Data

[63] Continuation of Ser. No. 98,780, Jul. 29, 1993, abandoned.

[30] Foreign Application Priority Data

Aug. 3, 1992 [JP] Japan .................................... 4-206561

[51] Int. Cl.⁶ ...................................................... G06F 13/14
[52] U.S. Cl. ..................... 395/200.43; 395/728; 395/476; 395/468; 395/200.42
[58] Field of Search ..................... 395/200.09, 200.07, 395/728

[56] References Cited

U.S. PATENT DOCUMENTS

| | | | |
|---|---|---|---|
| 4,718,003 | 1/1988 | Andersen et al. | 395/200.08 |
| 5,057,998 | 10/1991 | Hirokawa | 395/200.07 |
| 5,297,260 | 3/1994 | Kametani | 395/293 |
| 5,341,473 | 8/1994 | Takayama | 395/200.08 |

*Primary Examiner*—William M. Treat
*Assistant Examiner*—Kenneth R. Coulter
*Attorney, Agent, or Firm*—Antonelli, Terry, Stout & Kraus, LLP

[57] ABSTRACT

A communication control apparatus includes a pair of communication controllers each having a dual port RAM (DPR) with an interruption request generating function. A master processor system is connected to one port of the DPR in one of the communication controllers. A slave processor system is connected to one port of the DPR in the other communication controller. A channel controller is connected to each of the other port of the DPR in one communication controller and to the other port of the other communication controller, respectively. Both of the channel controllers are coupled by a communication channel. Both of the communication controllers mutually transfer data on the communication channel so that the contents of the DPR in the pair of communication controllers always coincide, so that the master processor system and the slave processor system operate as if they were connected by one DPR.

18 Claims, 8 Drawing Sheets

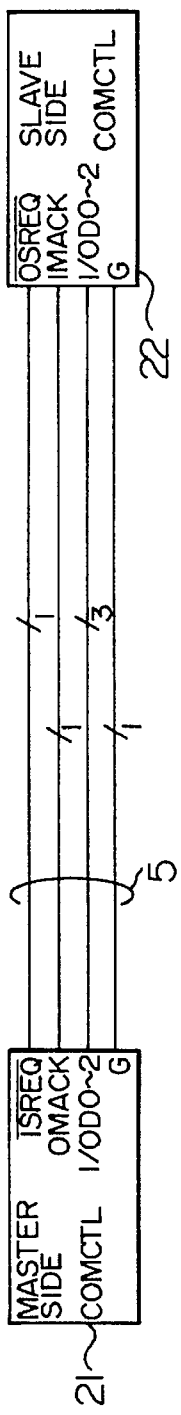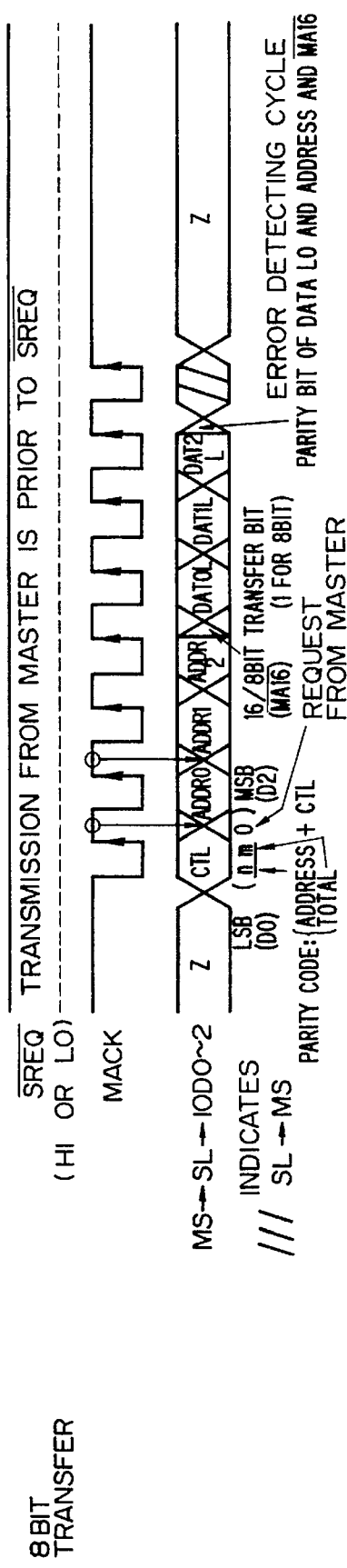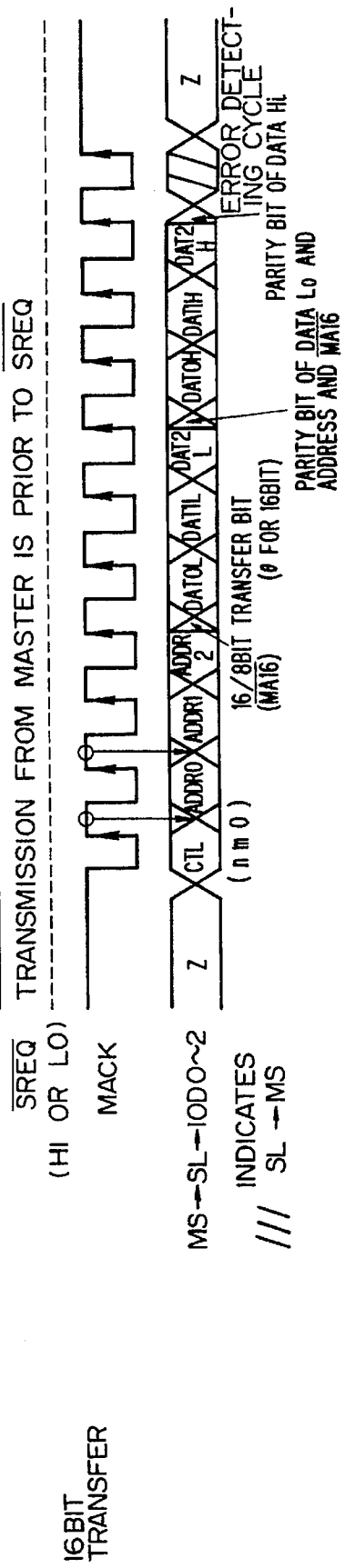
FIG. 4
FIG. 5A
FIG. 5B

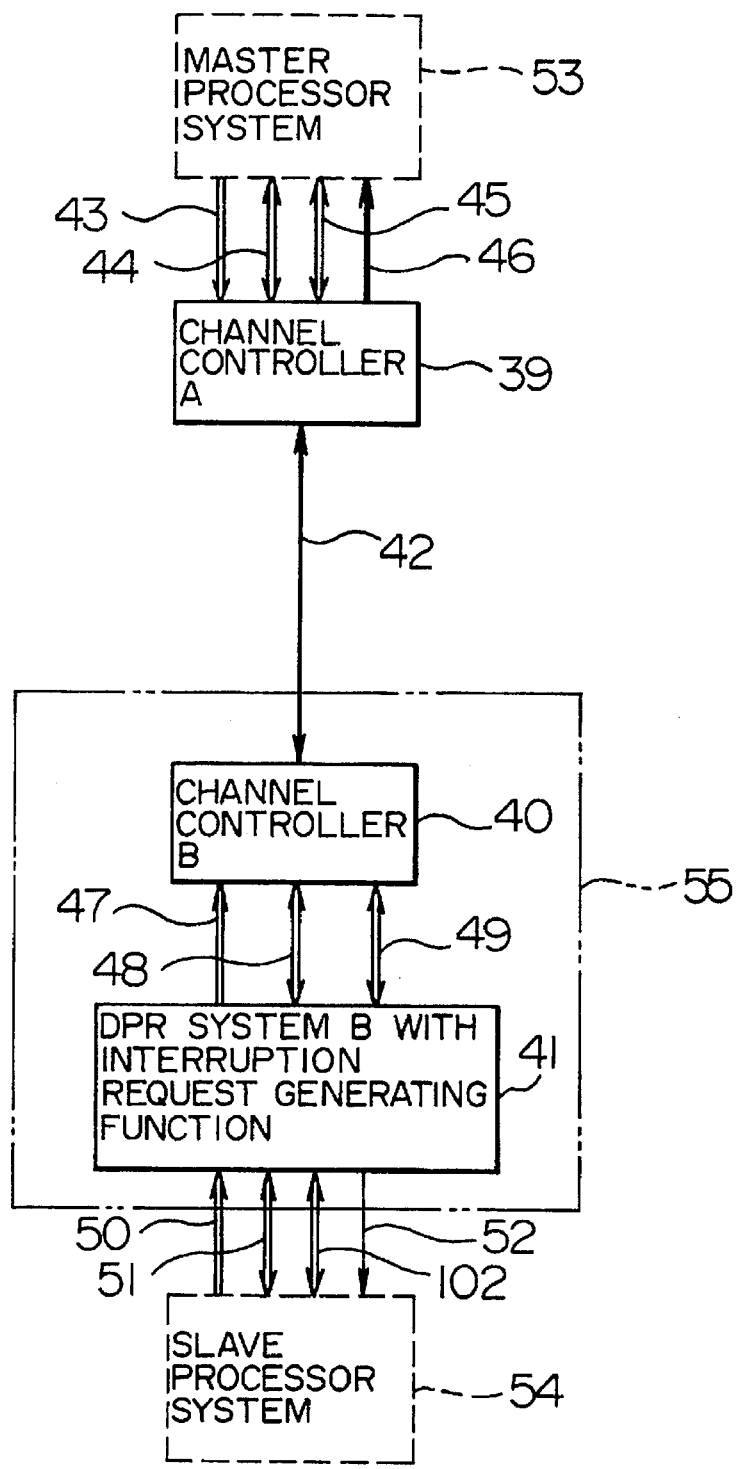

FIG. 6A  TRANSMISSION MODE FROM SLAVE TO MASTER

COMMUNICATION CONTROL APPARATUS BETWEEN PROCESSOR SYSTEMS

This application is a continuation application Ser. No. 08/098,780, filed on Jul. 29, 1993 now abandoned.

BACKGROUND OF THE INVENTION

The present invention relates to a communication control apparatus between processor systems and, more particularly, to a communication control apparatus suitable for communication through a communication line between a master processor system and a slave processor system which are located at remote positions with respect to each other and having a distance therebetween.

Nowadays, an electronic control is used in controls of various apparatuses and a load of processes to its electronic control is increasing more and more in association with an enlargement in size of the apparatus and complication and advancement of the control. When considering an automobile as an example of such an apparatus, electronic controls are used in the engine control, transmission control, brake control, suspension control, traction control, and the like. To cope with such a large control processing load, one electronic control unit (ECU) is allocated to each of the control processing units or the like.

In case of further advancing the control, it is necessary to transmit and receive information among microcomputers of such a plurality of ECUs. A network system of the vehicle controls is considered. As such a kind of apparatuses, for example, there are examples disclosed in JP-A-1-164203 and JP-A-1-164204. As a communication system between processors existing at remote positions which are used in such a kind of apparatuses, for example, there is a system such that disclosed in JP-A-63-255759 or the like.

As techniques regarding the present invention described later, there are examples as disclosed in U.S. Pat. No. 4,803,613, JP-A-63-101957, and JP-A-1-014605, the contents of which are incorporated herein by reference.

In the above conventional techniques, information that is necessary among a plurality of ECUs connected to a network is communicated on the network in the following manner.

When considering the case where, for example, five ECUs A to E are connected to the network as an example, to impartially generate data from each ECU, it is a general way to generate the data from each ECU to the network in accordance with a predetermined order. Namely, now assuming that the above order is set to, for instance, A, B, C, D, and E, the data is sequentially generated to the network in accordance with the order of the ECUs A, B, C, D, E, A, B, C, D, E, A, B, C, - - -.

In this case, however, while the ECU B is generating the data to the network, even when there occurs a necessity to generate the data which requires an emergency process from the ECU A, the ECU A cannot generate such data to the network until the order of the ECU A comes, namely, until the processes by the ECUs B, C, D, and E are finished, so that there is a problem such that a real-time property (instantaneousness) of the system control is low.

In such a system, as the number of ECUs connected to the network increases, a time interval (waiting time) from a timing when a certain ECU transmitted data to the network to a timing when the ECU can subsequently send data to the network increases, so that the real-time property of the system control further deteriorates.

On the other hand, even when the ECUs do not impartially execute the processes but distributed processes are executed while using the ECU A as a master processor system and using the ECUs B to E as slave processor systems, the ECU A always needs to continuously manage a processing status of each of the ECUs B to E. Therefore, as the number of slave processor systems and the number of tasks which are processed by the slave processor systems increase, the processing capability of the ECU A as a master processor system lacks, so that there occurs a problem such that the real-time manner deteriorates.

The communication control apparatus between processor systems according to the above literature has a problem such that the communication control apparatus doesn't have apparatuses such that when the data from a certain processor system is written as reception data, in a certain memory area in an random access memory (RAM) in the communication control apparatus, the communication control apparatus generates an interruption request, thereby informing such an interruption request to another processor system, so that another processor system cannot promptly respond to the data writing operation.

SUMMARY OF THE INVENTION

It is an object of the invention to provide a communication control apparatus in which in a pair of processor systems connected through one communication cable, a communication can be performed between the processor systems without losing a real-time property as a whole processor system.

Another object of the invention is to provide a communication control apparatus in which even when the number of a plurality of processor systems connected through communication lines increases, the real-time property of the system control as a whole processor system is not lost, thereby improving expansion property of a network.

Still another object of the invention is to provide a communication control apparatus which uses a communication channel or line having a relatively small number of signal lines, which path can transmit data at a high speed.

To solve the above problems, a communication control apparatus of the invention has preferably the following construction.

That is, a communication control apparatus according to the invention comprises: a dual port RAM (DPR) system A with an interruption request generating function in which one port is connected to a master processor system; a channel controller A connected to the other port of the DPR system A; a channel controller B connected to the channel controller A through a communication line or channel; and a DPR system B with an interruption request generating function in which one port is connected to the channel controller B and the other port is connected to a slave processor system, wherein coherency namely consistency is always held between the content of the data stored in the DPR system A and the content of the data stored in the DPR system B. With such a construction, the master processor system and the slave processor system are communicated through the communication line.

The DPR system A with the interruption generating function is connected to the master processor system by an address bus, a data bus, a control signal line, and an interruption signal line. The DPR system A can be accessed from the master processor system in a manner similar to ordinary memory. An interruption request signal and an interruption status signal can be generated from the DPR system A to the master processor system.

On the other hand, the DPR system B with the interruption request generating function is also similarly connected to the slave processor system by an address bus, a data bus, a control signal line, and an interruption signal line. The DPR system B can be accessed from the slave processor system in a manner similar to ordinary memory. An interruption request signal and an interruption status signal can be generated from the DPR system B to the slave processor system.

As mentioned above, by operation of the communication control apparatus of the invention, the contents of the DPR data of the DPR systems A and B which are installed at remote positions with respect to the distance between them are made coincident with each other. Therefore, the master processor system and the slave processor system function as if they access by commonly using one DPR. A load of the accessing process to the DPR by both of the processor systems, consequently, is reduced.

In response to the writing operation into a certain memory area in the relative DPR of one processor system, an interruption request to the other processor system is generated. Therefore, the real-time property (instantaneousness) of a request responding process of another processor to a processing request from one processor system to another is not lost.

BRIEF DESCRIPTION OF THE DRAWINGS

FIG. 4 is a schematic diagram showing a flow of signals in a communication line 5 connecting the master side communication controller and the slave side communication controller;

FIGS. 5A and 5B are conceptual diagrams each showing a channel communication protocol in a data transfer from the master side communication controller to the slave side communication controller according to the embodiment shown in FIG. 1;

FIGS. 6A and 6B are conceptual diagrams each showing a channel communication protocol in the data transfer from the slave side communication controller to the master side communication controller in the embodiment shown in FIG. 1;

FIG. 9 is a block diagram showing a whole construction of another embodiment of a communication control apparatus according to the invention.

DESCRIPTION OF THE PREFERRED EMBODIMENTS

Figure 1:
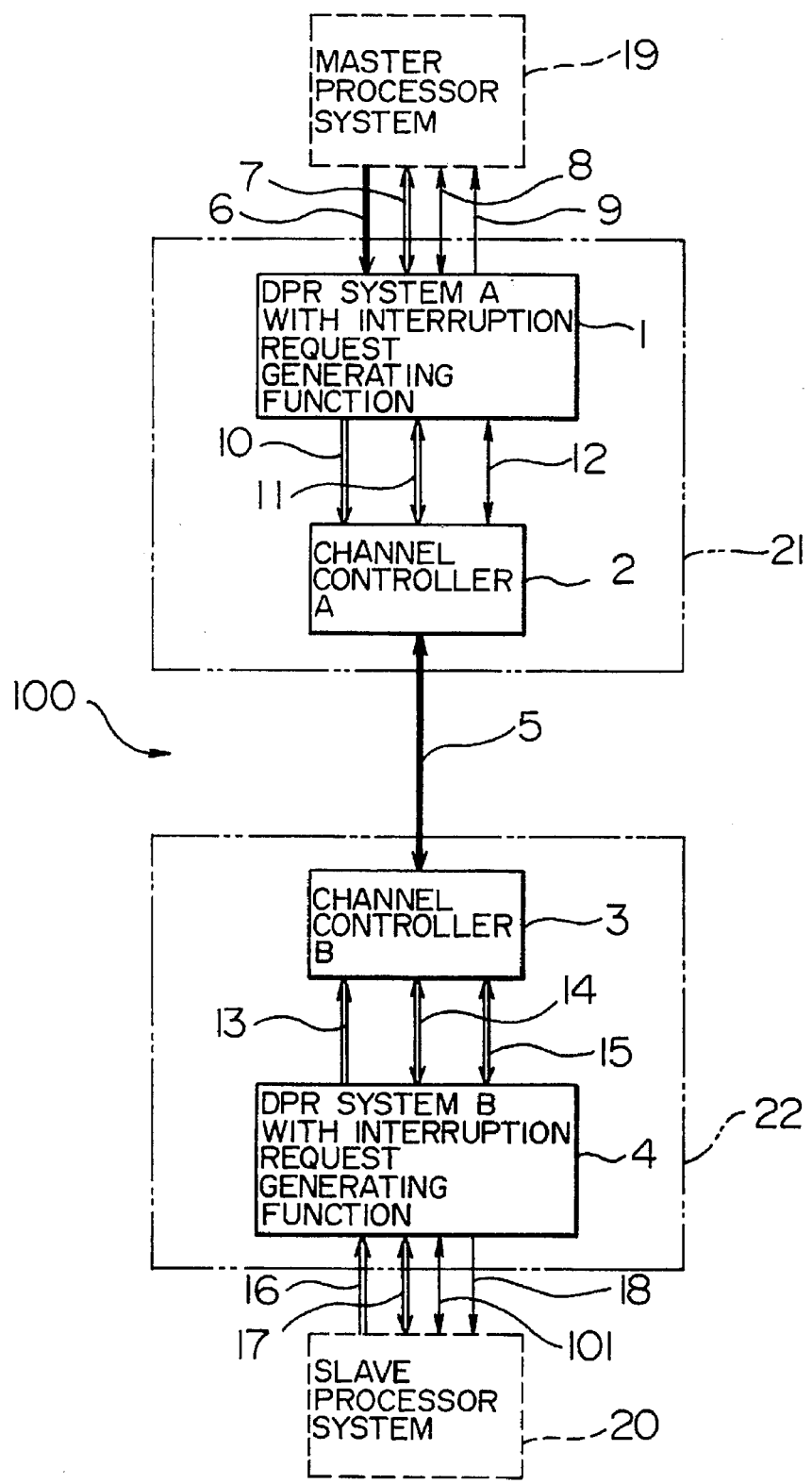
FIG. 1 is a block diagram showing a whole construction of a communication control apparatus according to the invention.

FIG. 1 shows an embodiment of a communication control apparatus according to the invention. A communication control apparatus 100 of the embodiment including a dual port random access memory (DPR) system A 1 with an interruption request generating function; a channel controller A 2 connected to the DPR system A 1 through an address bus 10, a data bus 11, and a control signal line 12; a channel controller B 3 connected to the channel controller A 2 by a signal line 5; and a DPR system B 4 with the interruption request generating function connected to the channel controller B 3 through an address bus 13, a data bus 14, and a control signal line 15.

The DPR system A 1 is further connected to a master processor system 19 by an address bus 6, a data bus 7, a control signal line 8, and an interruption signal line 9 including an interruption request signal INTN and an interruption status signal INTSTN. The DPR system B 4 with the interruption request generating function is connected to a slave processor system 20 by an address bus 16, a data bus 17, a control signal line 101, and an interruption signal line 18 including interruption request signal INTN and interruption status signal INTSTN. A data processing system is constructed as a whole while including the communication control apparatus 100.

In the data processing system with the above construction, the DPR system A 1 can be accessed from the master processor system 19 in a manner similar to ordinary memory. The interruption request signal INTN and interruption status signal INTSTN can be generated from the DPR system A 1 to the master processor system 19. The DPR system B 4 can be accessed from the slave processor system 20 in a manner similar to ordinary memory. The interruption request signal INTN and the interruption status signal INTSTN can be generated from the DPR system B 4 to the slave processor system 20. The last character N in the signal name indicates that the active state is at the low level.

In the embodiment, the content of the data in the DPR system A 1 with the interruption request generating function is substantially the same as the content of the data in the DPR system B 4 with the interruption request generating function, thereby always keeping a coherency namely consistency of the data That is, when the master processor system 19 writes data into the DPR system A 1, hardware of the channel controller A 2 automatically transmits information of an address and data to the channel controller B 3 in accordance with a predetermined channel communication protocol and writes the same data into the same address in the DPR system B 4 as that in the DPR system A 1.

When the master processor system writes data into a certain memory area in the DPR, the DPR system B generates an interruption request to the slave processor system and a fact that the writing operation was performed in a certain memory area in the DPR by the master processor system can be also informed to the slave processor system. In a manner similar to the above, when the slave processor system 20 writes data into the DPR system B 4, hardware of the channel controller B 3 also automatically transfers information of the address and the data to the channel controller A 2 in accordance with a predetermined channel communication protocol and the same data is written into the same address in the DPR system A 1 as that in the DPR system B. When the slave processor system writes data into a certain memory area in the DPR, the DPR system A generates an interruption request to the master processor system and a fact that the data writing operation was executed in a certain memory area in the DPR by the slave processor system is informed to the master processor system.

The setting of the channel controller and the DPR system with the interruption request generating function are defined as a communication controller (COMCTL). When the communication controller is located on the master processor system 19 side for the signal line 5, it is defined to be the master side COMCTL. When the communication controller is located on the slave processor system 20 side for the signal line 5, it is defined to be the slave side COMCTL. In FIG. 1, the master side COMCTL corresponds to a communication controller 21. The slave side COMCTL corresponds to a communication controller 22.

Figure 2:
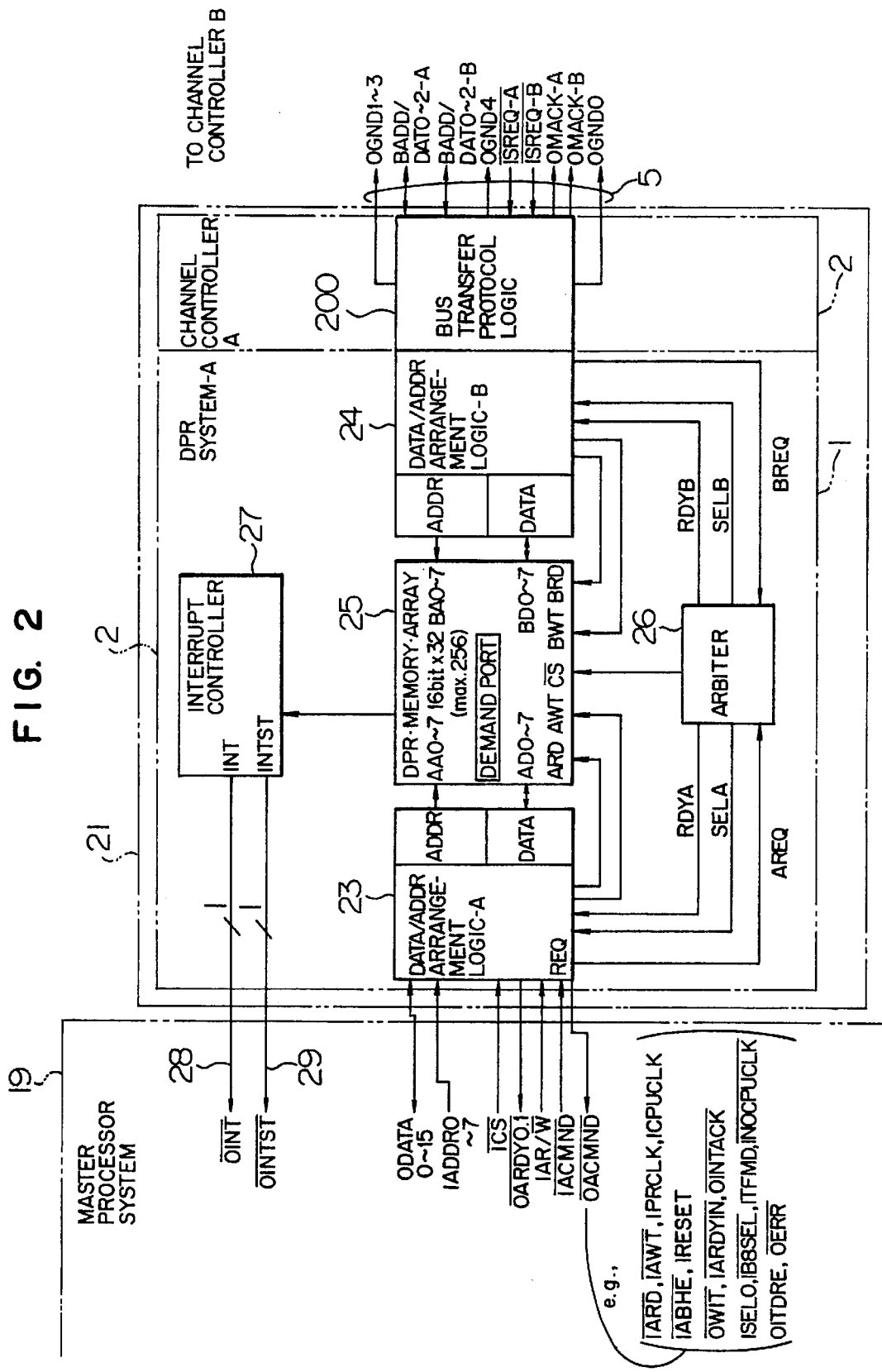
FIG. 2 is a block diagram showing an example of a construction of a main section of a master side communication controller shown in FIG. 1.
Figure 3:
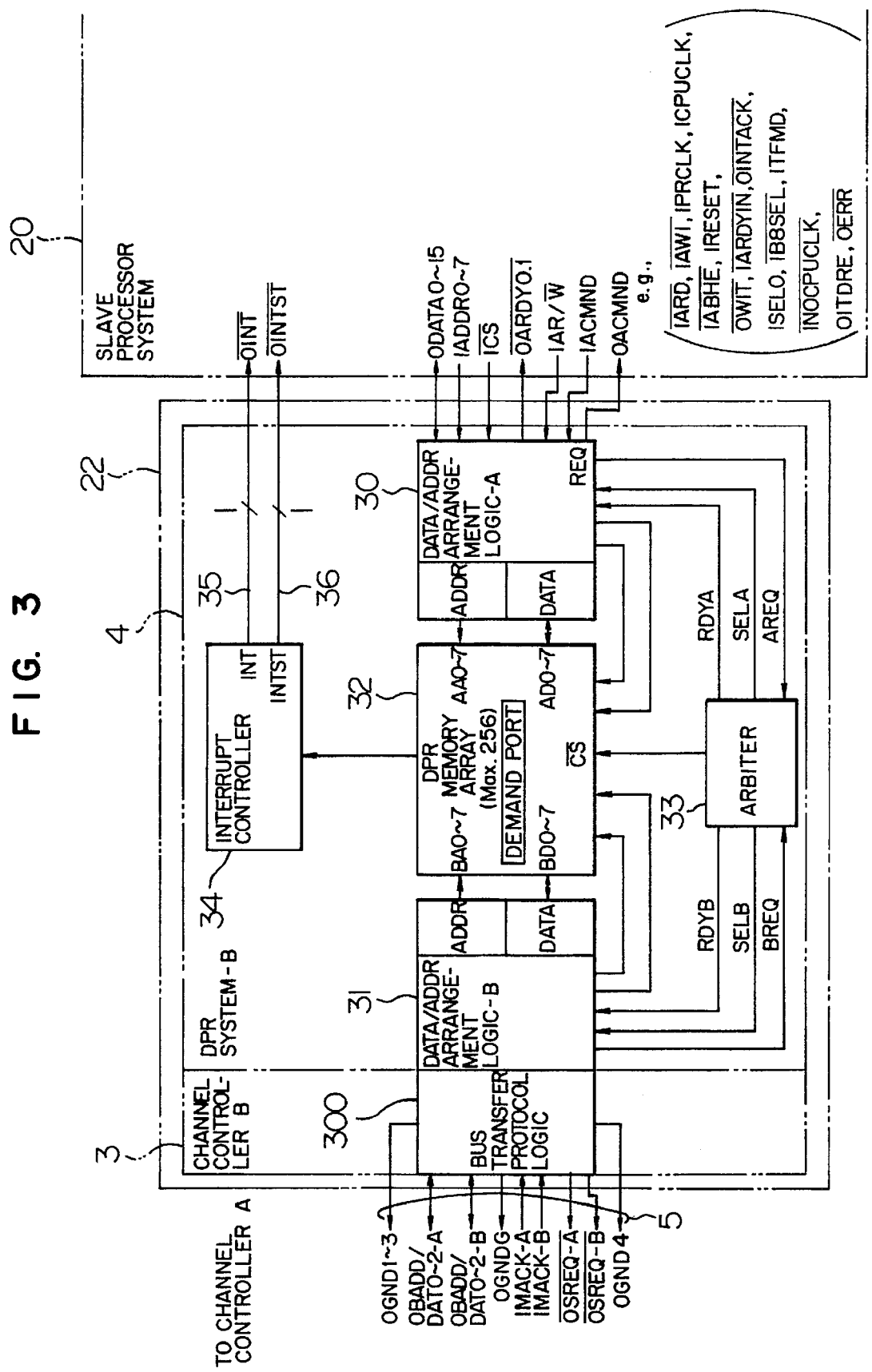
FIG. 3 is a block diagram showing an example of a construction of a main section of a slave side communication controller shown in FIG. 1.

FIG. 2 shows a block diagram of the master side COMCTL 21. FIG. 3 is a block diagram of the slave side COMCTL 22. As will be obviously understood from FIGS. 2 and 3, the master side COMCTL 21 and the slave side COMCTL 22 have constructions of almost the same type. It is possible to easily realize a construction such that each communication controller can execute the function of any one of the master side and slave side controllers. Further, since each of the communication controllers has almost the same type of construction, it is advantageous when they are formed by an LSI technique.

The operation of the communication control apparatus of the embodiment and the communication using a dynamic token loop between the master processor system using the communication control apparatus of the invention and the slave processor system will now be described.

FIG. 2 shows the master side communication controller COMCTL 21. In the diagram, the left side shows the interface side with the master processor system 19. The right side indicates an interface side with the channel (communication line 5). The master side COMCTL 21 shown in the diagram comprises: a DPR memory array 25; and a DATA/ADDR ARRANGEMENT LOGIC-A 23, a DATA/ADDR ARRANGEMENT LOGIC-B 24, a BUS TRANSFER PROTOCOL LOGIC 200, an arbitration circuit 26, and an interrupt controller 27 which are connected to the memory array 25. The DATA/ADDR ARRANGEMENT LOGIC-B 24 and the BUS TRANSFER PROTOCOL LOGIC 200 can be also integratedly constructed. The arbitration circuit (hereinafter, referred to as an arbiter) 26 is also connected to the DATA/ADDR ARRANGEMENT LOGIC-A (hereinafter, simply referred to as a logic-A) 23 and the DATA/ADDR ARRANGEMENT LOGIC-B (hereinafter, simply referred to as a logic-B) 24.

The BUS TRANSFER PROTOCOL LOGIC (hereinafter, simply referred to as a PROTOCOL LOGIC) 200 corresponds to the channel controller A 2 in FIG. 1. The portion including the LOGIC-B 24, memory array 25, arbiter 26, LOGIC-A 23, and interrupt controller 27 corresponds to the DPR system A with the interruption request generating function in FIG. 1. Since the LOGIC-B and the PROTOCOL LOGIC are integratedly formed, the address bus 10, data bus 11, and control signal line 12 shown in FIG. 1 are omitted in the diagram. The LOGIC-A 23 and interrupt controller 27 are connected to the master processor system 19. The PROTOCOL LOGIC 200 is connected to the communication line 5.

In the apparatus with the above construction, the case where the master processor system 19 communicates with the slave processor system 20 will now be described.

First, the master processor system 19 loads data file information for the slave processor system 20 into a data register and subsequently loads the job No. i into an end status register. A macro command m is finally loaded into a command register CMND and the processing routine is returned to a background process. The job No. 1 functions as a token. The operation of the macro commands and a construction of command ports are not concerned with an essential feature of the invention. Therefore, their detailed descriptions are omitted here. Please refer to the specification of U.S. Pat. No. 4,803,613 mentioned above for details.

Registers and commands which are written by the master processor system 19 are written into the command ports in the memory array 25. Namely, addresses (IADDR0 to IADDR7) for the command ports, data (ODATA0 to ODATA15) which is written into the command ports, and control signals (read signal IARDN, write signal IAWTN, etc.) shown by IACMNDN (the last character N in the signal name denotes a negative logic) in the diagram are given from the master processor system 19 to the LOGIC-A 23. From those signals, an address (AA0 to AA7) to the memory array 25, data (AD0 to AD7), a write signal AWT, and an access request signal AREQ to the memory array 25 that is outputted to the arbiter 26 are produced by the LOGIC-A 23 and are generated. The arbiter 26 arbitrates the access request (AREQ) to the memory array 25 from the LOGIC-A 23 and an access request (BREQ) to the memory array 25 from the LOGIC-B 24. The arbiter 26 returns a selection signal (SELA/SELB) and a ready signal (RDYA/RDYB) to the LOGIC-A or B which obtained an access request right and generates a chip selection signal (CSN) to the memory array 25.

When the master processor system 19 obtains the memory access right (when the access request to the LOGIC-A is admitted), predetermined data from the master processor system 19 is written into a predetermined command port in the memory array 25. The command port address and the data are sent to the LOGIC-B and the PROTOCOL LOGIC 200 and are supplied to the slave side communication controller 22 on the slave processor system 20 side through the communication line 5 in accordance with the channel communication protocol which is specified by the PROTOCOL LOGIC 200.

The operation in the slave side communication controller 22 will now be described with reference to FIG. 3. In FIG. 3, the right side shows the interface side with the slave processor system 20 and the left side shows the interface side with the channel (communication line 5). The slave side communication controller 22 is constructed in a manner similar to the master side communication controller 21 shown in FIG. 2. Reference numerals 23, 24, 25, 26, 27, and 200 in the master side communication controller 21 correspond to reference numerals 30, 31, 32, 33, 34, and 300 of the slave side communication controller 22, respectively.

Command port address and data which are sent from the communication line (channel) 5 to the slave side communication controller 22 shown in FIG. 3 are supplied to a PROTOCOL LOGIC 300 of the slave side communication controller 22. Those address and data are returned to address (BA0 to BA7) to a memory array 32 and data (BD0 to BD7) and are supplied to the memory array 32 together with a write signal BWT. In this instance, an access request signal BREQ to the memory array 32 is sent from a LOGIC-B 31 to an arbiter 33. The arbiter 33 arbitrates the access request (AREQ) to the memory array 32 from a LOGIC-A 30 and the access request (BREQ) to the memory array 32 from the LOGIC-B 31 and returns the selection signal (SELA/SELB) and ready signal (RDYA/RDYB) to the LOGIC-A or B which obtained the access request right and generates the chip selection signal (CSN) to the memory array 32. In the case where the LOGIC-B 31 (the channel side) obtains the access right to the memory array 32, the command port address and data sent to the slave side communication controller 22 are written into the memory array 32. Namely, the command ports whose data keeps coherency with the data of the command ports in the master side communication controller 21 are also prepared in the slave side communication controller 22.

On the other hand, the slave processor system 20 monitors the command register CMND in the command ports in the memory array 32 by a background process. When a value other than "0" is loaded into the command register, it is determined that there is a macro command from the master processor system 19, so that the necessary command port is read and the macro command process corresponding to it is executed. The slave processor system 20 can also execute the macro command process in response to the interruption request from the slave side communication controller 22. Please refer to the foregoing U.S. Pat. No. 4,803,613 with respect to the operation of the macro commands and a construction of the command ports.

After the process to the macro command was finished in the slave processor system 20, the slave processor system 20 loads parameters which are sent to the master processor system 19 into the data register in a demand port provided in the memory array 32. Subsequently, the content i (the job No. which is used as a token) of the end status register is echo backed to a request register DMND (provided in the demand port) to the master processor system 19 from the slave processor system 20 and the value in the command register is returned to "0". After that, the processing routine is returned to the background process.

The data register and the demand register DMND from the slave processor system 20 to the master processor system 19 are allocated to the demand ports in the memory array 32. That is, the address (IADDR0 to IADDR7) to the demand ports, data (ODATA0 to ODATA15) which are written into the demand ports, and control signals (read signal IARDN, write signal IAWTN, and the like) shown by IACMNDN (the last character N in the signal name indicates that the active state is at the low level) in the diagram are given from the slave processor system 20 to the LOGIC-A 30. From those signals, the LOGIC-A 30 produces the address (AA0 to AA7) to the memory 32, data (AD0 to AD7), write signal AWT, and access request signal AREQ to the memory array 32 which is supplied to the arbiter 33 and outputs them. The arbiter 33 arbitrates the access request (AREQ) to the memory array 32 from the LOGIC-A 30 and the access request (BREQ) to the memory array from the LOGIC-B 31 and returns the selection signal (SELA/SELB) and ready signal (RDYA/RDYB) to the LOGIC-A or B which obtained the access request right and generates the chip selection signal (CSN) to the memory array 32.

When he slave processor system 20 side obtains the memory access right, predetermined data is written into a predetermined demand port in the memory array 32 and the demand port address and data are sent to the PROTOCOL LOGIC 300 and are supplied to the master side communication controller 21 on the master processor system 19 through the communication line 5 (channel) in accordance with the channel communication protocol which is specified by the PROTOCOL LOGIC 300. The channel communication protocol will be described in detail hereinlater.

The demand port address and data sent to the master side communication controller 21 shown in FIG. 2 are supplied to the PROTOCOL LOGIC 200 of the master side communication controller 21 and are returned to the address (BA0 to BA7) to the memory array 25 and the data (BD0 to BD7) by the LOGIC-B 24 and are supplied to the memory array 25 together with the write signal BWT. In this instance, the access request signal BREQ to the memory array 25 is sent from the LOGIC-B 24 to the arbiter 26. The arbiter 26 arbitrates the access request (AREQ) to the memory array 25 from the LOGIC-A 23 and the access request (BREQ) to the memory array 25 from the LOGIC-B 24 and returns the selection signal (SELA/SELB) and ready signal (RDYA/RDYB) to the LOGIC-A or B which obtained the access request right and supplies the chip selection signal (CSN) to the memory array 25. When the communication line 5 (channel) side gets the memory access right, the demand port address and data supplied from the slave side communication controller 22 are written into the memory array 25. That is, the demand port which keeps the coherency with the demand port in the slave side communication controller 22 are also prepared in the master side communication controller 21.

When the data is written into the demand register DMND in the demand port, a signal indicating that the writing operation was performed in the demand register is sent to the interrupt controller 27. On the basis of this signal, the interrupt controller 27 produces an interruption request signal OINTN 28 and an interruption status signal OINTSTN 29 and supplies them to the master processor system 19.

When the master processor system 19 receives the signals OINTN and OINTSTN, the master processor system 19 accepts the interruption and, thereafter, starts the interruption services according to the content of the interruption. A routine to read the demand register has been described in the interruption services. Due to this, the master processor system 19 gives the address (IADDR0 to IADDR7) to the demand register and control signals (read signal IARDN and the like) shown by IACMNDN (the last character N in the signal name indicates a negative logic) in the diagram to the master side communication controller 21. From those signals, the LOGIC-A 23 produces the address (AA0 to AA7) to the arbiter 26, read signal ARD, and access request signal AREQ to the memory array 25 that is supplied to the memory array 25 and generates them. The arbiter 26 arbitrates the access request (AREQ) to the memory array 25 from the LOGIC-A 23 and the access request (BREQ) to the memory array 25 from the LOGIC-B 24 and returns the selection signal (SELA/SELB) and ready signal (RDYA/RDYB) to the LOGIC-A or B which got the access request right and supplies the chip selection signal (CSN) to the memory array 25.

When the master processor system 19 gets the memory access right, the master processor system 19 reads the job No. i written in the demand register and knows that the slave processor system 20 finished the process of the job of the job No. i. By reading the value in the register in the demand port as necessary, the result of the process in the slave processor system 20 is received. After that, the next process (for example, generation of the next macro command) is executed.

It is now assumed that the method of controlling the system by a top-down command and bottom-up demand between the processor systems using a dynamic token loop in which the job No. i is set to a token is called an autonomous type system control.

A channel communication protocol between the communication controllers COMCTL will now be described.

As a channel communication protocol between the communication controllers COMCTL (more strictly speaking, between the PROTOCOL LOGIC 200 and 300), there are mainly two kinds of communication protocols comprising a channel communication protocol from the master processor system 19 side to the slave processor system 20 side and a channel communication protocol from the slave processor system 20 side to the master processor system 19 side. FIG. 5 shows the channel communication protocol from the master processor system 19 side to the slave processor system 20 side. FIG. 6 shows the channel communication protocol from the slave processor system 20 side to the master processor system 19 side.

As shown in FIG. 4, five kinds of signals of SREQN, MACK, and IOD0 to IOD2 and a ground G for signals are necessary for the channel communication between the COMCTLs 21 and 22. SREQN denotes the signal indicative of an information transfer request from the slave side COMCTL 21 to the master side COMCTL 22. MACK denotes the clock signal which is generated from the master side COMCTL 21 to the slave side COMCTL 22. ID00 to ID02 denote the signals indicative of a control code, an address, and data which are generated synchronously with the clock signal MACK. There are three signal lines by which the data actually flows. The head character I of the signal name in the diagram indicates an input signal and reference character O denotes an output signal. I/O denotes an input/output signal. In FIG. 5B, explanation will now be made with respect to the case where data (D0 to D15) of 16 bits and address (A0 to A7) information of 8-bits will now be described as an example. An embodiment in the case where the data of 16 bits and address information of 8 bits are transferred will now be described as an example in FIG. 5A.

1. The Case of Transferring Data From the Master Side COMCTL 21 to the Slave Side COMCTL 22

(a) The Case of Transferring 8-Bit Data (FIG. 5A)

As shown in FIG. 5A, the transfer from the master side COMCTL 21 to the slave side COMCTL 22 is started irrespective of whether the transfer request signal SREQN from the slave side COMCTL 22 is active or non-active. The data information is outputted in parallel every three bits on the three signal lines IOD0 to IOD2 by the following sequence synchronously with the clock signal MACK.
<No. 0>Control code CTL.
The second bit (MSB):
 MREQN indicative of the transfer direction (when MREQN=0, it indicates the transfer from the master side COMCTL 21 to the slave side COMCTL 22, and when MREQN=1, it indicates the transfer from the slave side COMCTL 22 to the master side COMCTL 21)
The first bit:
 Parity bit of D0 to D7, A0 to A7, MA16N, and MREQN
 Where, MA16N indicates a length of data which is transferred. (when MA16N=0, it indicates the 16-bit transfer, and when MA16N=1, it indicates the 8-bit transfer)
The 0th bit (LSB):
 Parity bit of MREQN, MA16N, and A0 to A7
<No. 1>Address code ADDR0
The second bit (MSB): Address A2
The first bit: Address A1
The 0th bit (LSB): Address A0
<No. 2>Address code ADDR1
The second bit (MSB): Address A5
The first bit: Address A4
The 0th bit (LSB): Address A3
<No. 3>Address code ADDR2
The second bit (MSB): MA16N
The first bit: Address A7
The 0the bit (LSB): Address A6
<No. 4>Data code DAT0L
The second bit (MSB): Data D2
The first bit: Data D1
The 0th bit: Data D0
<No. 5>Data code DAT1L
The second bit (MSB): Data D5
The first bit: Data D4
The 0th bit (LSB): Data D3
<No. 6>Data code DAT2L
The second bit (MSB):
 Parity bit of D0 to D7, A0 to A7, and MA16N
The first bit: Data D7
The 0th bit (LSB): Data D6

An error detecting cycle is subsequently executed. In this cycle, the parity information formed on the basis of the information received by the slave side COMCTL 22 is sent from the slave side COMCTL 22 to the master side COMCTL 21 and is compared with the original information, thereby detecting a transfer error. When no error is detected in the error detecting cycle, the transfer operation is finished. When some errors occur, the transfer operation is again executed.

(b) The Case of Transferring 16-Bit Data

As shown in FIG. 5B, the transfer from the master side COMCTL 21 to the slave side COMCTL 22 is started irrespective of whether the transfer request signal SREQN from the slave side COMCTL 22 is active or non-active. The information is outputted in parallel every three bits to IOD0 to IOD2 by the following sequence synchronously with the clock signal MACK.
<No. 0>Control code CTL
The second bit (MSB):
 MREQN indicative of the transfer direction (when MREQN=0, it indicates the transfer from the master side COMCTL 21 to the slave side COMCTL 22, and when MREQN=1, it indicates the transfer from the slave side COMCTL 22 to the master side COMCTL 21)
The first bit:
 Parity bit of D0 to D15, A0 to A7, MA16N, and MREQN
 Where, MA16N indicates a length of dta which is transferred. (when MA16N=0, it indicates the 16-bit transfer, and when MA16N=1, it indicates the 8-bit transfer)
The 0th bit (LSB):
 Parity bit of MREQN, MA16N, A0 to A7
<No. 1>Address code ADDR0
The second bit (MSB): Address A2
The first bit: Address A1
The 0the bit (LSB): Address A0
<No. 2>Address code ADDR1
The second bit (MSB): Address A5
The first bit: Address A4
The 0th bit (LSB): Address A3
<No. 3>Address code ADDR2
The second bit (MSB): MA16N
The first bit: Address A7
The 0th bit (LSB): Address A6
<No. 4>Data code DAT0L
The second bit (MSB): Data D2
The first bit: Data D1
The 0th bit (LSB): Data D0
<No. 5>Data code DAT1L
The second bit (MSB): Data D5
The first bit: Data D4

The 0th bit (LSB): Data D3
<No. 6>Data code DAT2L
The second bit (MSB):
Parity bit of D0 to D7, A0 to A7, and MA16N
The first bit: Data D7
The 0th bit (LSB): Data D6
<No. 7>Data code DAT0H
The second bit (MSB): Data D10
The first bit: Data D9
The 0th bit (LSB): Data D8
<No. 8>Data code DAT1H
The second bit (MSB): Data D13
The first bit: Data D12
The 0th bit (LSB): Data D11
<No. 9>Data code DAT2H
The second bit (MSB):
Parity bit of D8 to D15
The first bit: Data D15
The 0th bit (LSB): Data D14

The error detecting cycle is subsequently executed. In this cycle, the parity information formed on the basis of the information received by the slave side COMCTL 22 is sent to the master side COMCTL 21 and is compared with the original information, thereby detecting a transfer error. When no error is detected in the error detecting cycle, the transfer operation is finished. When some errors occur, the transfer operation is again executed.

2. The Case of Transferring From the Slave Side COMCTL 22 to the Master Side COMCTL 21

(a) The Case of Transferring the 8-Bit Data

As shown in FIG. 6A, the request signal SREQN is made active, this request is accepted by the master side COMCTL 21, and the control code CTL is transferred from the master side COMCTL 21 to the slave side COMCTL 22. After that, the transfer from the slave side COMCTL 22 to the master side COMCTL 21 is started. The subsequent sequence is similar to that in the above case 1.(a) except the following point. That is, in the error detecting cycle, the parity information formed on the basis of the information received by the master side COMCTL 21 is sent to the slave side COMCTL 22 and is compared with the original information, thereby detecting a transfer error.

(b) The Case of Transferring the 16-Bit Data

Figure 6B:
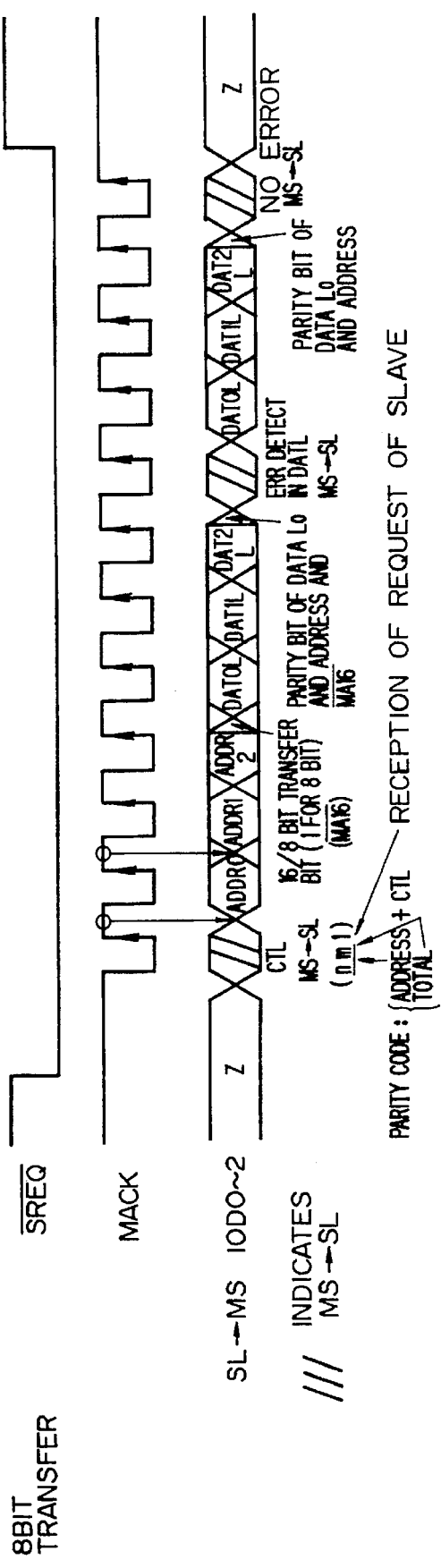
Figure 6B:
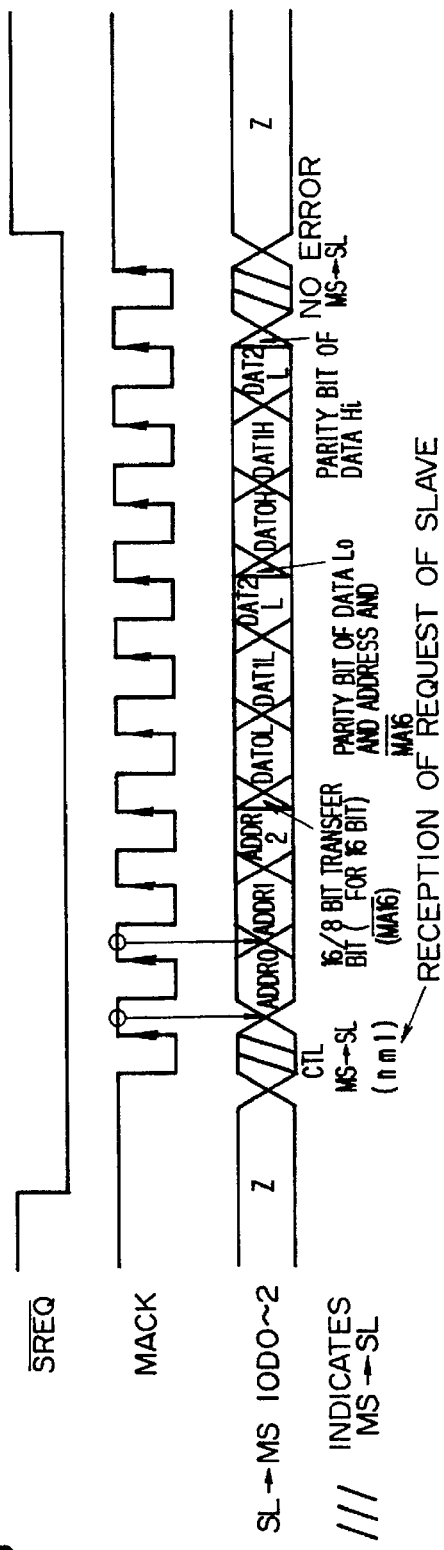

As shown in FIG. 6B, the request signal SREQN is made active, this request is accepted by the master side COMCTL 21, and the control code CTL is transferred from the master side COMCTL 21 to the slave side COMCTL 22. After that, the transfer from the slave side COMCTL 22 to the master side COMCTL 21 is started. The subsequent sequence is similar to that in the above case 1.(b) except the following point. In the error detecting cycle, the parity information formed on the basis of the information received by the master side COMCTL 21 is sent to the slave side COMCTL 22 and is compared with the original information, thereby detecting a transfer error.

According to the above operation sequence, the master processor system generates a command to the slave processor system and the process corresponding to the command is executed by the slave processor system. After that, the slave processor system generates a demand to the master processor system.

On the contrary, the embodiment can be also applied to a sequence such that the slave processor system generates a command to the master processor system and the process corresponding to the command is executed by the master processor system and, after that, the master processor system generates a demand to the slave processor system. The circuit operation in this instance is similar to that in the case where the slave processor system and the master processor system are replaced in the above operation description.

As a connecting method of signal lines to connect the master side COMCTL 21 and the slave side COMCTL 22, for example, a method such as a differential drive, a twisted pair, a single line, or the like can be used.

According to the embodiment, it is possible to construct a memory system such that even when the physical distance between the two processor system (for example, the master processor system and the slave processor system) is equal to a value within a range, for example, from a few meters to tens of meters, any one of the processor systems can correctly access to the DPR which is commonly used and, when it is necessary to access to a special area in the DPR, an interruption request can be formed to any one of the two processor systems. Consequently, an autonomous type system control can be accomplished between the two processor systems.

Further, by executing the communication between the channel controller A 2 on the master processor system 19 side and the channel controller B 3 on the slave processor system 20 side by using the channel communication protocol, the number of signal lines in the communication lines between them can be reduced as compared with the case where they are coupled by buses. Consequently, the costs of the communication system can be reduced and the reliability of the communication for the electromagnetic field noises which are caused from the outside can be raised.

According to the embodiment, three data lines are prepared in the communication line 5 and are made operative in parallel. Therefore, it is sufficient to use three clocks MACK (only data portion) to transfer the 8-bit data and a random access speed can be raised as compared with a serial communication system for transferring data one bit by one.

One of the reasons why three data lines in the communication line 5 are used in the embodiment is based on that in many cases data is generally transferred on an 8-bit unit basis. Namely, when a parity bit of one bit is added to the 8-bit data, the number of bits of the data is equal to nine, which is a multiple of 3. Therefore, when three signal lines are used, it is convenient to transfer the data on an 8-bit unit basis.

On the other hand, when data consists of a unit of 16 bits, by adding the parity bit of one bit to every 8 bits of the data, namely, by adding two bits as a total to the 16-bit data, the number of bits is equal to 18, which is also a multiple of 3. The communication line of the embodiment is also convenient to transfer the data on a 16-bit unit basis.

In the embodiment of the invention shown in FIG. 1, when the master processor system 19 reads information from the DPR, the information can be directly read out from the DPR system A 1 with the interruption request generating function. When the DPR system A 1 with the interruption request generating function is read from the master processor system 19, even in the case where the slave processor system 20 simultaneously reads the DPR system B 4 with the interruption request generating function, no confliction occurs with each other. There is, consequently, an effect such that the random access speed to the DPR of the master processor system 19 and slave processor system 20 can be raised.

By using the construction of the embodiment shown in FIG. 1, it is seen from the user side as if the master processor system and the slave processor system were coupled by one DPR with the mutual interruption request generating function. Moreover, since there is no need to be conscious of the channel communication protocol in particular, even when the master processor system is away from the slave processor system with respect to a distance, a good use efficiency similar to that in the case where they are coupled by the DPR with the mutual interruption request generating function through buses can be obtained.

In the invention, as a control of the system, an autonomous type system control by the dynamic token loop using such a command/demand (dynamic request) is used. By executing such a bottom-up type system control, even in case of a system of a hierarchy structure including a plurality of processors, each processor can be made autonomous.

Therefore, even in the case where the master processor system 19 is physically away from the slave processor system 20 (for example, a few meters to tens of meters), information of an amount larger than it is needed is not supplied from the slave processor system 20 to the master processor system 19. On the other hand, since all of the tasks which can be processed by the slave processor system 20 can be processed by the slave processor system 20, a communication amount between the master processor system 19 and the slave processor system 20 and a load of processes of the master processor system 19 can be remarkably reduced. As compared with the conventional multitasking using the OS, the master processor system 19 can dynamically manage the slave processor system 20 by a very small overhead.

Since the master processor system 19 processes one sequential sequence, in spite of the fact that the multitasking is executed on the mater processor system 19, its software can be easily described. Moreover, as a control of the whole system, there is an effect such that it is possible to obtain characteristics similar to those in the case where a concentrated management by the top-down control from the master processor system 19 to the slave processor system 20 is executed.

Figure 7:
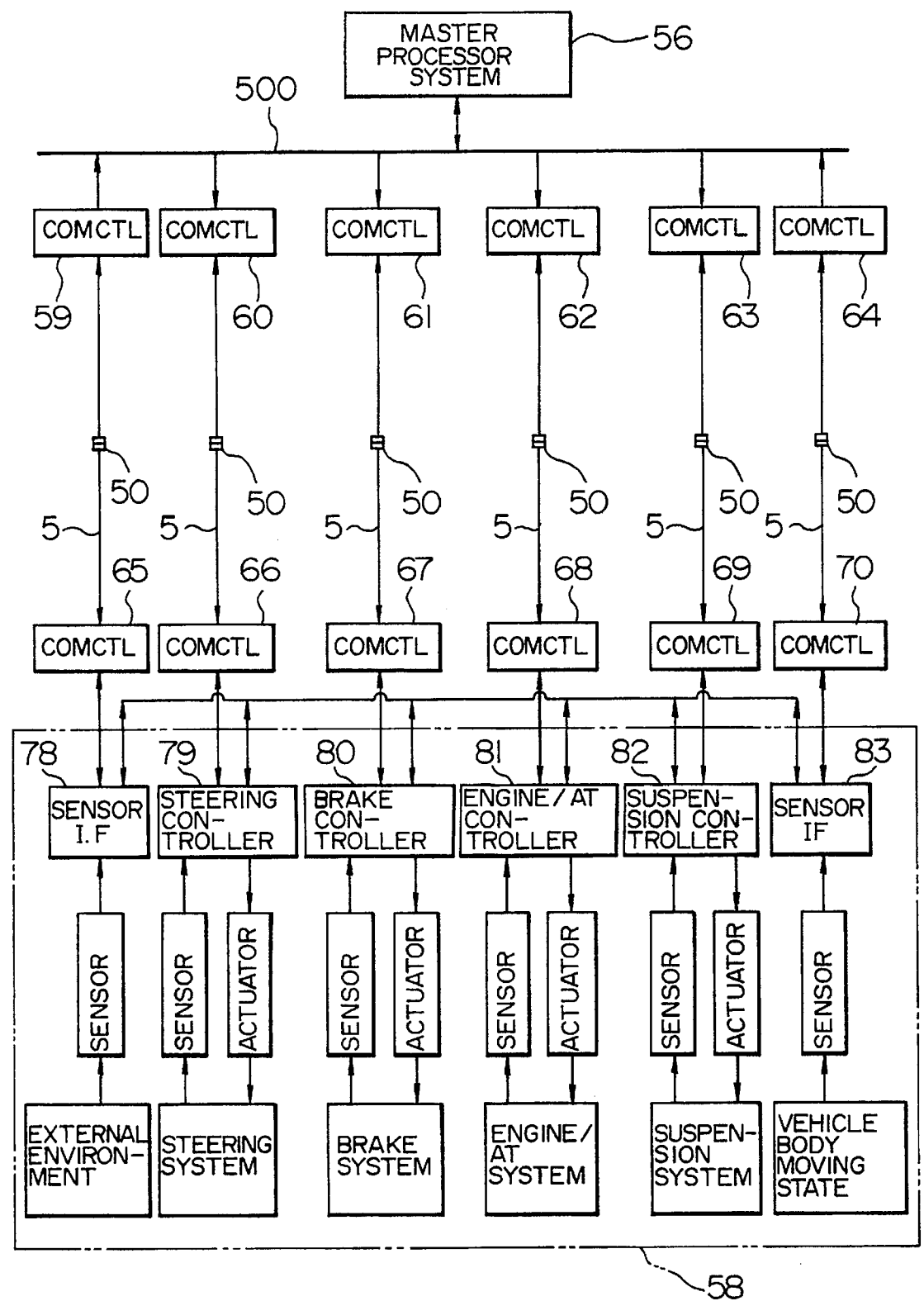
FIG. 7 is a block diagram showing a whole construction of an electronic control system of an automobile having a plurality of slave processor systems for one master processor system to which the invention is applied.

An example in which the invention is applied to an electronic control system of an automobile will now be described with reference to FIG. 7. An embodiment shown in FIG. 7 is constructed by: a master processor system 56; a plurality of master side COMCTL 59 to 64 connected to the master processor system 56 through a bus 500; and a plurality of slave processors 58 connected to the master side COMCTL 59 to 64 through slave side COMCTL 65 to 70. The master side COMCTL 59 to 64 and the slave side COMCTL 65 to 70 have constructions similar to those of the master side COMCTL 21 and slave side COMCTL 22 described in the embodiment shown in FIG. 1. In FIG. 7, reference numeral 5 denotes the communication line to transfer data to the ECU arranged in each section in the automobile and 50 indicates a wire harness. In the case where a number of communication lines 5 must be wired in a narrow space as in an automobile, the communication control apparatus of the invention is particularly suitable.

In the embodiment shown in FIG. 7, the slave processor systems 58 are constructed by: a sensor interface processor 78; a steering controller 79; a brake controller 80; an engine/AT controller 81; a suspension controller 82; and a sensor interface processor 83. Further, a target system is added under each slave processor. In the second embodiment shown in FIG. 7, as target systems, there are an external environment in case of assuming that an automobile connected to the sensor interface processor 78 is controlled, a steering system connected to the steering controller 79, a brake system connected to the brake controller 80, an engine/AT system connected to the engine/AT controller 81, a suspension system connected to the suspension controller 82; a motion state of a vehicle body connected to the sensor interface processor 83; and the like.

As shown in FIG. 7, it is possible to realize a construction such that a plurality of slave processor systems 78 to 83 are connected to the single master processor system 56 through the bus 500.

The communication with the master processor system 56 in the system control of each slave processor system is executed in accordance with the operations which have already been described.

The operation of the slave processor system 78 will now be described as an example. The slave side COMCTL 65 sends command information from the master processor system 56 which is transferred from the master side COMCTL 59 in accordance with a predetermined communication protocol to the sensor interface processor 78. The demand information to the master processor system 56 is sent from the sensor interface processor 78 to the master side COMCTL 59 in accordance with a predetermined communication protocol.

Since the operations of the other slave processor systems are also similar to those mentioned above, their descriptions are omitted here.

In the embodiment, the system control is executed by the autonomous type system control using the command/demand (dynamic request by the dynamic token loop which has already been described. By executing such an autonomous type system control, for instance, each processor system of the control system of a hierarchy structure including a plurality of slave processor systems as shown in FIG. 7 can be made autonomous.

In FIG. 7, the slave processor systems 78 to 83 can be also connected by a communication line 550. Such a construction can be used to rapidly inform the occurrence of an abnormality to another slave processor system when an abnormal state occurs in a certain slave processor system.

Figure 8:
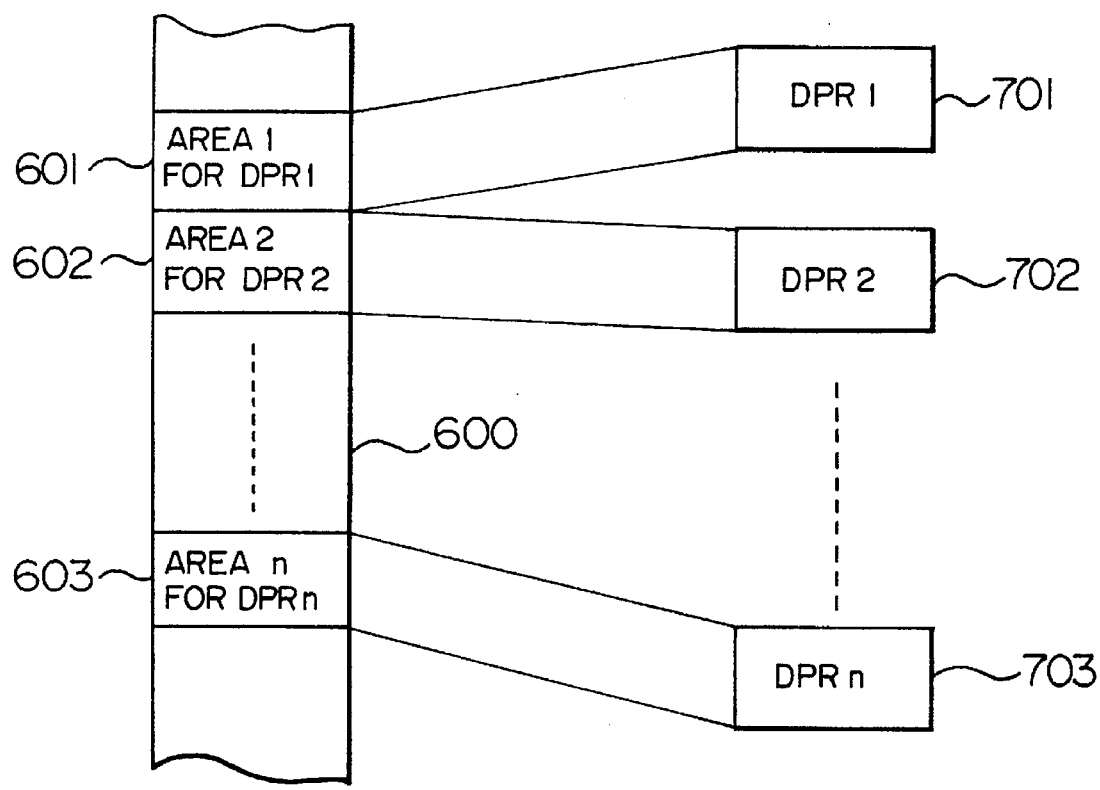
FIG. 8 is a schematic diagram showing an example of address maps of DPRs in the master processor system and a plurality of slave processor systems shown in FIG. 7.

FIG. 8 shows an example of a construction of DPRs in the case where single master processor system is connected with a plurality of slave processor systems by a plurality of communication control systems according to the invention as shown in FIG. 7.

In FIG. 8, an address space 600 on the master processor system side has DPR areas 601 to 603 corresponding to memory areas in DPRs 701 to 703 of a plurality of slave processor systems. The master processor system can access to a desired slave processor system by accessing a predetermined address range of the address space 600.

In the construction of FIG. 8, the master processor system needs to have an address space larger than a capacity of each DPR of the slave processor systems. However, by using an address space expanding method, the construction of FIG. 7 can be realized without largely reducing the address space of the master processor system as compared with the DPR area which the slave processor system has.

FIG. 9 shows another embodiment of the invention. In FIG. 9, the DPR system A on the master processor system side is omitted.

In a system having a DPR system B 41 with an interruption request generating function on only one side (slave processor system 54 side in case of FIG. 9), when a master processor system 53 reads the DPR system B 41, a channel controller A 39 sends an address from which the master processor system 53 reads and an access request to a channel controller B 40 in accordance with a predetermined channel communication protocol. The channel controller B 40 returns the information of the address and access request sent from the channel controller A 39 in accordance with the predetermined channel communication protocol into the original information in accordance with a predetermined channel communication protocol and transfers to the DPR system B 41. The DPR system B 41 with the interruption request generating function arbitrates the accesses of the DPRs on the basis of such information. When it is possible to access, the data of the address is sent to the channel controller B 40. When it is impossible to access, the master processor system is allowed to wait until the access can be performed. The data sent to the channel controller B 40 is sent to the channel controller A 39 in accordance with a predetermined channel communication protocol. The channel controller A 39 returns the information of the data sent from the channel controller B 40 in accordance with the predetermined channel communication protocol into the original information in accordance with a predetermined channel communication protocol and transfers to the master processor system 53.

Since the other operations are substantially the same as those in the embodiment shown in FIG. 1, their detailed descriptions are omitted.

We claim:

1. A communication control apparatus comprising:

a first dual port random access memory (DPR) in which a first port is connected to a first processor system;

a second DPR in which a first port is connected to a second processor system;

a first communication controller unit connected to a second port of said first DPR;

a second communication controller unit connected to a second port of said second DPR;

a communication channel for coupling said first and second communication controller units to each other, wherein said first and second communication controller units communication with each other through said communication channel, and, in response to a data write access to an address of one of said first and second DPRs, said first and second communication controller units updates data only at a corresponding address of the other of said first and second DPRs, in order to keep data in the one DPR consistent with data in the other DPR;

a first logic unit which is connected between said first processor system and said first port of said first DPR and writes data from said first processor system into a desired address in said first DPR in response to a data writing request from said first processor system and reads out data from said desired address of said first DPR in response to a data reading request from said first processor system and sends said data to said first processor system;

a second logic unit which is connected between said second processor system and said first port of said second DPR and writes data from said second processor system into a desired address in said second DPR in response to a data writing request form said second processor system and reads out data from said desired address in said second DPR in response to a data reading request from said second processor and sends said data to said second processor system;

a first arbiter connected to said first logic unit, said first communication controller and said first DPR, for automatically performing arbitration of accesses to said first DPR from said first and second processor systems; and a second arbiter connected to said second logic unit, said second communication controller and said second DPR for automatically performing arbitration of accesses to said second DPR from said first and second processor systems.

2. A communication Control apparatus comprising:

a first dual port random access memory (DPR) in which a first port is connected to a first processor system;

a second DPR in which a first port is connected to a second processor system;

a first communication controller unit connected to a second port of said first DPR;

a second communication controller unit connected to a second port of said second DPR;

a communication channel for coupling said first and second communication controller units to each other, wherein said first and second communication controller units communication with each other through said communication channel, and, in response to a data write access to an address of one of said first and second DPRs, said first and second communication controller units updates data only at a corresponding address of the other of said first and second DPRs, in order to keep data in the one DPR consistent with data in the other DPR;

a first logic unit which is connected between said first processor system and said first port of said first DPR and writes data from said first processor system into a desired address in said first DPR in response to a data writing request from said first processor system and reads out data from said desired address of said first DPR in response to a data reading request from said first processor system and sends said data to said first processor system; and a second logic unit which is connected between said second processor system and aid first port of said second DPR and writes data from said second processor system into a desired address in said second DPR in response to a data writing request form said second processor system and reads out data from said desired address in said second DPR in response to a data reading request from said second processor and sends said data to said second processor system;

wherein at least one of said first and second logic units includes means for generating an interruption request to a corresponding processor system connected to said at least one logic unit in response to writing of data into a certain area of a corresponding DPR connected to said corresponding processor system by a corresponding communication controller unit connected to said corresponding DPR, wherein said corresponding communication controller receives data from a processor system other than said corresponding processor system together with address information of the data to be written in said corresponding DPR, and said interrupt request generating means generates said interrupt request when the writing of the data into the certain area of said corresponding DPR is detected based on said address information.

3. An apparatus according to claim 1, wherein said communication channel has three data signal lines and said first and second communication controller units use a communication protocol such that address bits with a parity and transmission data bits with a parity to be transmitted to a DPR on an access destination side are divided and transmitted onto said three signal lines.

4. An apparatus according to claim 2, wherein the number of bits of said address or data is equal to a multiple of 8, wherein a parity is added to every predetermined number of bits of said address and every predetermined number of bits of said data.

5. An apparatus according to claim 2, wherein said first processor system is a master processor system, said second processor system is a slave processor system, said communication channel further includes a clock signal line, and said apparatus employs the following protocol:

upon transmission of data from said first communication controller unit to said second communication controller unit, said first communication controller unit generates a clock signal onto said clock signal line and transmits said address bits and said transmission data bits with the parity to said second DPR onto said three signal lines synchronously with said clock signal, and upon transmission of data from said second communication controller unit to said first communication controller unit, said first communication controller unit generates a clock signal onto said clock signal line, and said second communication controller unit transmits said address bits and said transmission data bits with the parity to said first DPR onto said three signal lines synchronously with said clock signal, wherein said address bits and said transmission data bits are transmitted in synchronism with said clock signals serving as synchronization signals.

6. A communication control apparatus for controlling data communication between a master processor system and a plurality of slave processor systems, in which said communication control apparatus includes a plurality of communication control blocks each corresponding to one of said plurality of slave processor systems, wherein each of said communication control blocks comprises:

a master side dual port random access memory (DPR) in which a first port is connected to said master processor system;

a slave side DPR in which a first port is connected to a corresponding slave processor system;

a master side communication controller unit connected to a second port of said master side DPR;

a slave side communication controller unit connected to a second port of said slave side DPR;

a communication channel for coupling said master side communication controller unit and said slave side communication controller unit to each other, wherein said communication controller units on the master side and slave side communicate with each other through said communication channel, and, in response to a data write access to an address of one of said master and slave side DPRs, said master and slave side communication controller units updates data only at a corresponding address of the other of said master and slave DPRs, in order to keep data in the one DPR consistent with data in the other DPR;

a master side logic unit which is connected between said master processor system and said first port of said master side DPR and writes data from said master processor system into a desired address in said master side DPR in response to a data writing request from said master processor system and reads out data from said desired address in said master side DPR in response to a data reading request from said master processor system and transfers said data to said master processor system;

a slave side logic unit which is connected between said corresponding slave processor system and said first port of said slave side DPR and writes data from said corresponding slave processor system into a desired address in said slave side DPR in response to a data writing request from said corresponding slave processor system and reads out data from said desired address in said slave side DPR in response to a data reading request from said corresponding slave processor system and transfers said data to said corresponding slave processor system a master arbiter connected to said master logic unit, said master communication controller and said master DPR, for automatically performing arbitration of accesses to said master DPR from said master and slave processor systems; and a slave arbiter connected to said slave logic unit, said slave communication controller and said slave DPR for automatically performing arbitration of accesses to said slave DPR from said master and slave processor systems.

7. An apparatus according to claim 6, wherein in each of said communication control blocks, said communication channel has three data signal lines, and said communication controller units on the master side and slave side use a communication protocol such that address bits with a parity and transmission data bits with a parity to DPR on an access destination side are divided and transmitted to said three signal lines.

8. An apparatus according to claim 7, wherein in each of said communication control blocks, said communication channel further includes a clock signal line, and said apparatus employs the following protocol:

upon transmission of data from said master side communication controller unit to said slave side communication controller unit, said master side communication controller unit generates a clock signal onto said clock signal line and transmits said address bits and said transmission data bits with the parity to said slave side DPR onto said three signal lines synchronously with said clock signal, and upon transmission of data from said slave side communication controller unit to said master ride communication controller unit, said master side communication controller unit generates a clock signal onto said clock signal line and said slave side communication controller transmits said address bits and said transmission data bits with the parity to said master side DPR onto said three signal lines synchronously with said clock signal, wherein said address bits and said transmission data bits are transmitted in synchronism with said clock signals serving as synchronization signals.

9. An apparatus according to claim 6, wherein said master processor system is a main processor system to manage a whole electronic control of an automobile, each of said plurality of slave processor systems is an electronic control unit of said automobile, and each of said communication channels is a wiring to couple said main processor system and a corresponding electronic control unit to each other.

10. A communication control apparatus for controlling data communication between a master processor system and a plurality of slave processor systems, in which said communication control apparatus includes a plurality of communication control blocks each corresponding to one of said plurality of slave processor systems, wherein each of said communication control blocks comprises:

a master side dual port random access memory (DPR) in which a first port is connected to said master processor system;

a slave side DPR in which a first port is connected to a corresponding slave processor system;

a master side communication controller unit connected to a second port of said master side DPR;

a slave side communication controller unit connected to a second port of said slave side DPR; and a communication channel for coupling said master side communication controller unit and said slave side communication controller unit to each other, wherein said communication controller units on the master side and slave side communicate with each other through said communication channel, and, in response to a data write access to an address of one of said master and slave side DPRs, said master and slave side communication controller units updates data only at a corresponding address of the other of said master and slave DPRs, in order to keep data in the one DPR consistent with data in the other DPR, a master side logic unit which is connected between said master processor system and said first port of said master side DPR and writes data from said master processor system into a desired address in said master side DPR in response to a data writing request from said master processor system and reads out data from said desired address in said master side DPR in response to a data reading request from said master processor system and transfers said data to said master processor system; and a slave side logic unit which is connected between said corresponding slave processor system and said first port of said slave side DPR and writes data from said corresponding slave processor system into a desired address in said slave side DPR in response to a data writing request from said corresponding slave processor system and reads out data from said desired addressed said slave side DPR in response to a data reading request from said corresponding slave processor system and transfers said data to said corresponding slave processor system, wherein in each of said communication control blocks, at least one of said logic units on the master side and slave side includes means for generating an interruption request to a corresponding processor system connected to said at least one logic unit in response to writing of data into a certain area of a corresponding DPR connected to said corresponding processor system by a corresponding communication controller unit connected to said corresponding DPR, wherein said corresponding communication controller receives data from a processor system other than said corresponding processor system together with address information of the data to be written in said corresponding DPR, and said interrupt request generating means generates said interrupt request when the writing of the data into the certain area of said corresponding DPR is detected on the basis of said address information.

11. An apparatus according to claim 10, wherein in each of said communication control blocks, the number of bits of said address or data is equal to a multiple of 8, wherein a parity is added to every predetermined number of bits of said address and every predetermined number of bits of said data.

12. A communication control apparatus comprising:

a dual port random access memory (DPR) in which a first port is connected to a first processor system;

a first communication controller unit connected to a second port of said DPR;

a second communication controller unit connected to a second processor system;

a communication channel to couple said first and second communication controller units to each other, wherein said first and second communication controller units communicate with each other through said communication channel, and said second processor system accesses said DPR by transmitting information containing an address of an area of said DPR to be accessed from said second communication controller unit to said first communication controller unit through said communication channel; and a logic unit which is connected between said first processor system and said first port of said DPR and writes data from said first processor system into a desired address in said DPR in response to a data writing request from said first processor system and reads out data from said desired address in said DPR in response to a data reading request from said first processor system and transfers said data to said first processor system, an arbiter connected to said logic unit, said first communication controller and said DPR, for automatically performing arbitration of accesses to said DPR from said first and second processor systems.

13. An apparatus according to claim 12, wherein said communication channel has three data signal lines, and said first and second communication controller units use a communication protocol such that address bits with a parity be transmitted to and transmission data bits with a parity to said DPR are divided and transmitted onto said three signal lines.

14. A communication control apparatus comprising:

a dual port random access memory (DPR) in which a first port is connected to a first processor system;

first communication controller unit connected to a second port of said DPR;

a second communication controller unit connected to a second processor system;

a communication channel to couple said first and second communication controller units to each other, wherein said first and second communication controller units communicate with each other through said communication channel, and said second processor system accesses said DPR by transmitting information containing an address of an area of said DPR to be accessed from said second communication controller unit to said first communication controller unit through said communication channel; and a logic unit which is connected between said first processor system and said first port of said DPR and writes data from said first processor system into a desired address in said DPR in response to a data writing request from said first processor system and reads out data from said desired address in said DPR in response to a data reading request from said first processor system and transfers said data to said first processor system, wherein said logic unit includes means for generating an interruption request to said first processor system in response to writing of data into a certain area in said DPR by said first communication controller unit;

wherein said first communication controller receives data from a processor system other than said first processor system together with address information of the data to be written in said DPR, and said interrupt request generating means generates said interrupt request when the writing of the data into the certain area of said DPR is detected based on said address information.

15. An apparatus according to claim 14, wherein the number of bits of said address of data is equal to a multiple of 8, wherein a parity is added to every predetermined number of bits of said address and every predetermined number of bits of said data.

16. An apparatus according to claim 14, wherein one of said first and second processor systems is a master processor system, the other is a slave processor system, said communication channel further includes a clock signal line, and said apparatus employs the following protocol:

upon transmission of data from said communication controller unit on the master processor system side (master side) to said communication controller unit on the slave processor system side (slave side), said master side communication controller unit generates a clock signal onto said clock signal line and transmits said address bits and said transmission data bits with the parity to said DPR onto said three signal lines synchronously with said clock signal, and upon transmission of data from said slave side communication controller unit to aid master side communication controller unit, said master side communication controller unit generates a clock signal onto said clock signal line, and said slave side communication controller unit transmits said address bits and said transmission data bits with the parity to said DPR onto said three signal lines synchronously with said clock signal, wherein said address bits and said transmission data bits are transmitted in synchronism with said clock signals serving as synchronization signals.

17. A communication protocol for supporting a communication from an apparatus A to an apparatus B, in which a communication of an address and data are executed in a following sequence by using three signal lines synchronously with a clock signal which is transmitted from the apparatus A to the apparatus B, comprising the steps of:

(a) transmitting a control code of total three bits from the apparatus A to the apparatus B, said three bits comprising an MREQN bit (1 bit) indicative of whether a communicating direction is either from the apparatus A to the apparatus B or from the apparatus B to the apparatus A, and a parity code (2 bits) for said address, said data, said MREQN and an MA16N bit (a bit) indicative of whether a number of bits of data to be transmitted is equal to 16 or 8;

(b) transmitting total 9 bits from the apparatus A to the apparatus B, said 9 bits consisting of 8 bits of said address and the MA16N bit indicating whether the data to be transmitted is either 16 bits or 8 bits, said 9 bits being transmitted three bits at a time three times, (c1) wherein said MA16N bit in said step (b) indicates that 8-bit data is transmitted;

transmitting total nine bits from the apparatus A to the apparatus B, said nine bits consisting of the 8 bit data and one parity bit for the 8 bit data, said address and said MA16N, said nine bits being transmitted three bits at a time three times, (c2) wherein said MA16N bit in said step (b) indicates that 16-bit data is transmitted;

transmitting total 18 bits from the apparatus A to the apparatus B, said 18 bits consisting of the 16 bit data, one parity bit for lower 8 bits of the 16 bit data, said address and said MA16N, and one parity bit for upper 8 bits of the 16 bit data three bits at a time six times; and (d) producing parity information by said apparatus B on a basis of information as to the address the data received by the apparatus B, and transmitting the parity information from the apparatus B to the apparatus A, said parity information being compared with information on the apparatus A, thereby checking a transfer error by the apparatus A, and when no error is detected, the transfer operation being finished, and when there is an error, the transfer operation being again executed; and automatically performing arbitration of transmission between said apparatus A and said apparatus B so that transmission from only one of said apparatus A and apparatus B is conducted.

18. A communication protocol for supporting a communication from an apparatus B to an apparatus A, in which an address and data are communicated in the following steps by using three signal lines synchronously with a clock signal which is transmitted from the apparatus A to the apparatus B, comprising the steps of:

(a) transmitting from the apparatus B to the apparatus A an SREQN signal indicative of a transmission request from the apparatus B to the apparatus A;

(b) after said transmission request was accepted by the apparatus A, transmitting a control code of total three bits from the apparatus A to the apparatus B, said three bits consisting of an MREQN bit (1 bit) indicative of whether a communicating direction is either from the apparatus A to the apparatus B or from the apparatus B to the apparatus A, and a parity code (2 bits) for said MREQN, an MA16N bit indicating whether transmission data is of 16 bits or 8 bits, said address and said data;

(c) transmitting total nine bits from the apparatus B to the apparatus A, said nine bits consisting of eight bits for the address and one MA16N bit indicating whether transmission data is of 16 bits or 8 bits, said nine bits being transmitted three bits at a time three times;

(d1) wherein said MA16N bit in said step (c) indicates transmission of the 8-bit data;

transmitting total nine bits from the apparatus B to the apparatus A, said nine bits consisting of the 8 bit data and one parity bit for the 8 bit data, the address and the MA16N, said nine bits being transmitted three bits at a time three times;

(d2) wherein said MA16N bit in said step (c) indicates transmission of the 16-bit data;

transmitting total 18 bits from the apparatus B to the apparatus A, said 18 bits consisting of the 16 bit data, one parity bit for lower eight bits of the 16 bit data, the address and the MA16N, and one parity bit for upper eight bits of the 16 bit data, said 18 bits being transmitted three bits at a time six times; and (e) producing parity information by the apparatus A on a basis of information as to the address and the data received by the apparatus A, and transmitting the parity information from the apparatus A to the apparatus B, said parity information being compared with information on the apparatus B, thereby checking a transfer error by the apparatus B, and when no error exists, the transfer operation being finished, and when there is an error, the transfer operation being again executed;

automatically performing arbitration of transmission reguests from said apparatus A and said apparatus B so that transmission from only one of said apparatus A and apparatus B is conducted.

\* \* \* \* \*